United States Patent
Tech et al.

(10) Patent No.: US 10,432,969 B2
(45) Date of Patent: Oct. 1, 2019

(54) 3D VIDEO DATA STREAM COMPRISING A VALUE TABLE ASSOCIATING REFERENCE VIEWS AND CAMERA PARAMETER IN TEMPORAL UNIT SCOPE AND BEYOND TEMPORAL UNIT SCOPE PARAMETER SETS AND AN ENCODER FOR ENCODING AND A DECODER FOR DECODING THE 3D VIDEO DATA STREAM

(71) Applicant: Fraunhofer-Gesellschaft zur Foerderung der angewandten Forschung e.V., Munich (DE)

(72) Inventors: Gerhard Tech, Berlin (DE); Karsten Suehring, Berlin (DE); Detlev Marpe, Berlin (DE); Thomas Wiegand, Berlin (DE)

(73) Assignee: Fraunhofer-Gesellscaft zur Foerderung der angewandten Forschung e.V., Munich (DE)

(*) Notice: Subject to any disclaimer, the term of this patent is extended or adjusted under 35 U.S.C. 154(b) by 95 days.

(21) Appl. No.: 15/668,939

(22) Filed: Aug. 4, 2017

(65) Prior Publication Data

US 2017/0332101 A1    Nov. 16, 2017

Related U.S. Application Data

(63) Continuation of application No. PCT/EP2016/052406, filed on Feb. 4, 2016.

(30) Foreign Application Priority Data

Feb. 5, 2015  (EP) .................................... 15154021

(51) Int. Cl.
*H04N 19/597* (2014.01)
*H04N 19/70* (2014.01)
(Continued)

(52) U.S. Cl.
CPC ......... *H04N 19/597* (2014.11); *H04L 65/607* (2013.01); *H04N 19/463* (2014.11); *H04N 19/70* (2014.11)

(58) Field of Classification Search
CPC .... H04N 19/597; H04N 19/70; H04N 19/463; H04L 65/607
See application file for complete search history.

(56) References Cited

U.S. PATENT DOCUMENTS

2013/0188013 A1* 7/2013 Chen ................... H04N 19/597
348/43

OTHER PUBLICATIONS

Tech, Gerhard et al., "3D-HEVC Draft Text 6", JCT3V-J1001, Joint Collaborative Team on 3D Video Coding Extensions of ITU-T SG 16 WP 3 and ISO/IEC JTC 1/SC 29/WG 11 10th Meeting: Strasbourg, FR, Oct. 18-24, 2014.

(Continued)

*Primary Examiner* — James M Pontius
(74) *Attorney, Agent, or Firm* — Perkins Coie LLP; Michael A. Glenn

(57) ABSTRACT

A 3D video data stream including a set of coded views coded in the 3D video data stream in temporal units is shown. The 3D video data stream further includes a parameter set including a first table having an entry for each coded view which indicates by indexing for the respective coded view a number of reference views for which a relative camera parameter is present in the data stream, wherein a scope of the parameter set is beyond the scope of the temporal units.

7 Claims, 10 Drawing Sheets

(51) Int. Cl.
H04N 19/463 (2014.01)
H04L 29/06 (2006.01)

(56) References Cited

OTHER PUBLICATIONS

Chang, Yu-Lin et al., "3D-HEVC HLS: Camera Parameter Signaling and Depth Reference Selection", Joint Collaborative Team on 3D Video Coding Extensions of ITU-T SG 16 WP 3 and ISO/IEC JTC 1/SC 29/WG 11 4th Meeting, Apr. 20-26, 2013, 1-10.
Tech, Gerhard et al., "On 3D-HEVC HLS and Its Alignment with MV-HEVC HLS", Joint Collaborative Team on 3D Video Coding Extensions of ITU-T SG 16 WP 3 and ISO/IEC JTC 1/SC 29/WG 11 10th Meeting, Oct. 14, 2014, 1-14.
Tech, Gerhard et al., "Proposed HLS Cleanup for 3D-HEVC", Joint Collaborative Team on 3D Video Coding Extensions of ITU-T SG 16 WP 3 and ISO/IEC JTC 1/SC 29/WG 11 11th Meeting, Feb. 18, 2015, 1-18.

\* cited by examiner

| coded view (view order index i) | m = 0 (view order index i of the respective reference view) | flag-indicating whether relative camera parameters associated with the coded view are present | count of the number of reference views |
|---|---|---|---|
| 1 | | no | 0 |
| 2 | 1 | yes | 1 |
| 3 | 1, 2 | yes | 2 |

Fig. 2

| vps_3d_extension( ) { | Descriptor |
|---|---|
|   cp_precision | ue(v) |
|   for( n = 1; n < NumViews; n++ ) { | |
|     i = ViewOIdxList[ n ] | |
|     ~~cp_present_flag[ i ]~~ | ~~u(1)~~ |
|     ~~if( cp_present_flag[ i ] ) {~~ | |
|     <u>num_cp[ i ]</u> | <u>u(v)</u> |
|     <u>if( num_cp[ i ] > 0 ) {</u> | |
|       cp_in_slice_segment_header_flag[ i ] | u(1) |
|       <u>for( m = 0; m < num_cp[ i ]; m++ ) {</u> | |
|         <u>cp_ref_voi[ i ][ m ]</u> | <u>ue(v)</u> |
|       if( !cp_in_slice_segment_header_flag[ i ] ) { | |
|         ~~for( m = 0; m < n; m++ ) {~~ | |
|         ~~j = ViewOIdxList[ m ]~~ | |
|         <u>j = cp_ref_voi[ i ][ m ]</u> | |
|         vps_cp_scale[ i ][ j ] | se(v) |
|         vps_cp_off[ i ][ j ] | se(v) |
|         vps_cp_inv_scale_plus_scale[ i ][ j ] | se(v) |
|         vps_cp_inv_off_plus_off[ i ][ j ] | se(v) |
|         } | |
|       } | |
|     } | |
|   } | |
| } | |

Fig. 5

| | Descriptor |
|---|---|
| slice_segment_header( ) { | |
| ... | |
|   if( nuh_layer_id > 0 && cp_in_slice_segment_header_flag[ ViewIdx ] ) | |
|     ~~for( m = 0; ViewOIdxList[ m ] < ViewIdx; j++ ) {~~ | |
|       ~~j = ViewOIdxList[ m ]~~ | |
|     for( m = 0; m < num_cp[ ViewIdx ]; m++ ) { | |
|       <u>j = cp_ref_voi[ ViewIdx ][ m ]</u> | |
|       cp_scale[ j ] | se(v) |
|       cp_off[ j ] | se(v) |
|       cp_inv_scale_plus_scale[ j ] | se(v) |
|       cp_inv_off_plus_off[ j ] | se(v) |
|     } | |
| ... | |
| } | |

Fig. 6

| vps_3d_extension( ) { | Descriptor |
|---|---|
| ... | |
|     for( n = 1; n < NumViews; n++ ) { | |
|         i = ViewOIdxList[ n ] | |
| ... | |
|         for( m = 0; m < n; m++ ) { | |
|             j = ViewOIdxList[ m ] | |
|             vps_cp_scale[ i ][ j ] | se(v) |
|             vps_cp_off[ i ][ j ] | se(v) |
| ... | |
|         } | |
|     } | |
| ... | |
| } | |

Fig. 11

```
for( i = 0; i <= MaxLayersMinus1; i++ ) {
    lId = layer_id_in_nuh[ i ]
    ...
    VpsDepthFlag[ lId ] = ScalabilityId[ i ][ 0 ]
    ViewOrderIdx[ lId ] = ScalabilityId[ i ][ 1 ]
    AuxId[ lId ] = ScalabilityId[ i ][ 3 ]
    ...
    if( i > 0 ) {
        newViewFlag = 1
        for( j = 0; j < i; j++ )
            if( ViewOrderIdx[ lId ] == ViewOrderIdx[ layer_id_in_nuh[ j ] ] )
                newViewFlag = 0
        if( newViewFlag )
            ViewOIdxList[ NumViews++ ] = ViewOrderIdx[ lId ]
} ...
```

Fig. 12

3D VIDEO DATA STREAM COMPRISING A VALUE TABLE ASSOCIATING REFERENCE VIEWS AND CAMERA PARAMETER IN TEMPORAL UNIT SCOPE AND BEYOND TEMPORAL UNIT SCOPE PARAMETER SETS AND AN ENCODER FOR ENCODING AND A DECODER FOR DECODING THE 3D VIDEO DATA STREAM

CROSS-REFERENCE TO RELATED APPLICATIONS

This application is a continuation of copending International Application No. PCT/EP2016/052406, filed Feb. 4, 2016, which is incorporated herein by reference in its entirety, and additionally claims priority from European Application No. EP15154021.8, filed Feb. 5, 2015, which is incorporated herein by reference in its entirety.

The present invention relates to a 3D video data stream and an encoder for encoding and a decoder for decoding the 3D video data stream. Embodiments show a camera parameter signaling in the 3D video data stream.

BACKGROUND OF THE INVENTION

Several 3D-HEVC coding tools utilize depth information from depth layers for decoding of texture layers. For this, depth values of a depth layer of a current view are converted to disparities related to another view. Conversion is performed by scaling and offsetting. Scale and offsets are signaling in the VPS (Video Parameter Set) when constant for the video sequences. When scale and offsets vary over time, the signaling is performed in the slice headers.

Scale and offset depend on spatial position of the other view relative to the current view. For this, multiple scale and offset pairs are signaled for a current view, such that each pair is related to one of the views preceding the current view in coding order.

E.g., assuming that the bitstream includes views with view order indices 0, 2, 4, intention of the current design would be to signal the following shifts and offsets:

for view 0: none
for view 2: related to view 0
for view 4: related to view 0 and related to view 2

In the current design [2] parsing of scale and offsets is performed, e.g. in the VPS in two loops. This is exemplary indicated in FIG. 11.

NumViews specifies the number of views (e.g., 3 in the above example) and ViewOIdxList maps the index m, which indicates the positions of a pair in the bitstream, to a view order index (e.g. ViewOIdxList is [0 2 4], in the above example).

ViewOIdxList is derived in the VPS extension by iterating over all layers present in the bitstream and appending the view order index of a layer to the end of ViewOIdxList, when it is not yet present in ViewOIdxList. An exemplary syntax of the iteration is shown in FIG. 12.

Assuming, e.g. following VPS information:
=0; IId=0; ViewOrderIdx[IId]=0; VpsDepthFlag[IId]=0
i=1; IId=1; ViewOrderIdx[IId]=0; VpsDepthFlag[IId]=1
i=2; IId=2; ViewOrderIdx[IId]=2; VpsDepthFlag[IId]=0
i=3; IId=3; ViewOrderIdx[IId]=2; VpsDepthFlag[IId]=1
i=4; IId=4; ViewOrderIdx[IId]=4; VpsDepthFlag[IId]=0
i=5; IId=5; ViewOrderIdx[IId]=4; VpsDepthFlag[IId]=1
would result in ViewOIdxList={0, 2, 4}.

Note that, since the current 3D-HEVC specification needs the depth layer of a view to directly follow the texture layer, the order of values in ViewOIdxList corresponds to the coding order of views, when texture and depth is present for all layers.

A first issue of the current design refers to auxiliary pictures. The 3D-HEVC allows the presence of auxiliary picture layers interleaved with primary picture layers for backwards compatibility with MV-HEVC.

The following VPS information for a bitstream including an auxiliary layer
i=0; IId=0; ViewOrderIdx[IId]=0; VpsDepthFlag[IId]=0; AuxId[IId]=0
i=1; IId=1; ViewOrderIdx[IId]=4; VpsDepthFlag[IId]=0; AuxId[IId]=1
i=2; IId=2; ViewOrderIdx[IId]=0; VpsDepthFlag[IId]=1; AuxId[IId]=0
i=3; IId=3; ViewOrderIdx[IId]=2; VpsDepthFlag[IId]=0; AuxId[IId]=0
i=4; IId=4; ViewOrderIdx[IId]=2; VpsDepthFlag[IId]=1; AuxId[IId]=0
i=5; IId=5; ViewOrderIdx[IId]=4; VpsDepthFlag[IId]=0; AuxId[IId]=0
i=6; IId=6; ViewOrderIdx[IId]=4; VpsDepthFlag[IId]=1; AuxId[IId]=0
would result in ViewOIdxList={0, 4, 2} and hence to the presence of following scale and offsets:

for view 0: none
for view 4: related to view 0
for view 2: related to view 0 and related to view 4

It can be seen that for view 4, scale and offset values to view 2 are missing. However, decoding of texture layer 5 might need scale and offset values related to view 2, when referring to the preceding depth layer 4.

A second issue of the current design refers to bitstream extraction and/or VPS rewriting. Scale and offset values can be signaled in the VPS or in the slice headers. However, the number of signaled scale and offset pairs, as well as the views the pairs are related to, depend currently on ViewOIdxList, which depends on the layers present in bitstream as signaled in the VPS. Thus, when layers are discarded from the bitstream (and the VPS is rewritten to signal this), the current design needs also rewriting of all slice segment headers, which is undesirable.

E.g., assuming that ViewOIdxList is equal to {0, 2, 4}, and that views 2 and 4 only depend on view 0, and that view 2 is discarded and the VPS is rewritten, also rewriting of all slice segments header of layers of view 4 would be involved to remove camera parameters related to view 2.

SUMMARY

According to an embodiment, a 3D video data stream may have: a set of coded views coded in the 3D video data stream in temporal units; and a parameter set having a first table having an entry for each coded view, which indicates by indexing for the respective coded view a number of reference views for which a relative camera parameter is present in the data stream, wherein a scope of the parameter set is beyond the scope of the temporal units.

Another embodiment may have a decoder, wherein the decoder is configured to decode a set of coded views from the 3D video data stream in temporal units; wherein the decoder is configured to derive a parameter set from the 3D video data stream having a first table having an entry for each coded view which indicates by indexing for the respective coded view a number of reference views for which the relative camera parameter is present in the data stream, wherein a scope of the parameter set is beyond the scope of the temporal units.

Another embodiment may have an encoder for encoding 3D video data into a 3D video data stream, wherein the encoder is configured to encode a set of coded views from the 3D video data into the 3D video data stream in temporal units; wherein the encoder is further configured to encode a parameter set having a first table having an entry for each coded view, which indicates by indexing for the respective coded view a number of reference views for which a relative camera parameter is present in the data stream, wherein a scope of the parameter set is beyond the scope of the temporal units.

According to another embodiment, a method for decoding a 3D video data stream may have the steps of: decoding a set of coded views from the 3D video data stream in temporal units; deriving a parameter set from the 3D video data stream having a first table having an entry for each coded view which indicates by indexing for the respective coded view a number of reference views for which the relative camera parameter is present in the data stream, wherein a scope of the parameter set is beyond the scope of the temporal units.

According to another embodiment, a method for encoding a 3D video data stream may have the steps of: encoding a set of coded views from the 3D video data into the 3D video data stream in temporal units; encoding a parameter set beyond the scope of the temporal units into the 3D video data stream having a first table having an entry for each coded view, which indicates by indexing for the respective coded view a number of reference views for which a relative camera parameter is present in the data stream.

Another embodiment may have a non-transitory digital storage medium having a computer program stored thereon to perform the method for decoding a 3D video data stream, the method having the steps of: decoding a set of coded views from the 3D video data stream in temporal units; deriving a parameter set from the 3D video data stream having a first table having an entry for each coded view which indicates by indexing for the respective coded view a number of reference views for which the relative camera parameter is present in the data stream, wherein a scope of the parameter set is beyond the scope of the temporal units, when said computer program is run by a computer.

Another embodiment may have a non-transitory digital storage medium having a computer program stored thereon to perform the method for encoding a 3D video data stream, the method having the steps of: encoding a set of coded views from the 3D video data into the 3D video data stream in temporal units; encoding a parameter set beyond the scope of the temporal units into the 3D video data stream having a first table having an entry for each coded view, which indicates by indexing for the respective coded view a number of reference views for which a relative camera parameter is present in the data stream, when said computer program is run by a computer.

The present invention is based on the finding that it is advantageous to directly indicate the associated reference views for which relative camera parameters (e.g. scale and offset values) are present for a current coded view. (Note that, in the following we denote all coded views that preceed a current coded view in decoding order as reference views, as they may be referred to by using associated relative camera parameters. A decoder, however, may not use the reference views to decoded the current coded view.) This direct indication outperforms the previously described indirect indication in terms of robustness and used (maximum) bandwidth of the 3D video generation, as it is on the one hand not needed to signal relative camera parameters related to reference views that are not used for decoding of the current coded view, but on the other hand such a signalling is still possible, e.g. to use the transmitted relative camera parameters after decoding e.g. for view synthesis. Moreover, the approach is robust against the presence of auxiliary layers which may disorder a structured list of views such that dependencies of different views may no longer be obtained from the order of the views in the aforementioned list.

Relative camera parameter (e.g. scale and offset values) associated with a coded view and a reference view may change within consecutive frames or slices. Therefore, it is advantageous that relative camera parameter (e.g. scale and offset values) should be present in each frame or slice header or the coded view. If, in such a scenario, one view is removed (e.g. by a network entity), the inventive direct indexing can remain unchanged. Relative camera parameter associated with the removed reference view can remain in slice headers, although they may not be required anymore. The known indirect indexing would need a complete rewriting of all slice headers using a large amount of computational power. In this case e.g., the described absolute (or direct) indexing may be computationally more effective than known approaches. In other words, direct indexing may refer to a list or table in the data stream, where indexes referring from a coded view to an associated reference view are listed. In contrast, using indirect indexing, the linking or referencing from a coded view to an associated reference view has to be derived from other variables or entries in the data stream, revealing the referencing after a further processing of the variable and therefore revealing the referencing indirectly.

Embodiments show a 3D video data stream comprising a set of coded views coded into the 3D video data stream in temporal units. The 3D video data stream further comprises a parameter set comprising a first table having an entry for each coded view, which indicates by indexing for the respective coded view a number of reference views for which a relative camera parameter is present in the data stream. A coded view may be encoded (or decoded) relative to a reference view, meaning e.g. that depth information are used together with scale and/or offset values of the relative camera parameter to refer to a reference view.

According to embodiments, the parameter set may be beyond the scope of the temporal units, for example implemented in the VPS. This is advantageous, since static, constant, or non-varying relative camera parameter (e.g. scale and offset values), may be provided or transmitted once for a coded view of a video sequence. Therefore, the data to be transmitted may be reduced when compared e.g. to a slice-based transmission of the relative camera parameter (e.g. scale and offset values). However, according to further embodiments, the relative camera parameter (e.g. scale and offset values) may vary over time for a coded view within a video sequence. Therefore, the relative camera parameter (e.g. scale and offset values) may be implemented or input to the slice headers of (each) slice of a coded view of the current video sequence. In the case of varying relative camera parameter (e.g. scale and offset values), it is further advantageous to already indicate the association of relative camera parameters to different reference views globally, for example in the VPS, to enable a decoder to determine the associations only once for each video sequence, and to provide relative camera parameters (e.g. scale and offset values), individually for each slice of a coded view of the video sequence such as for example in each slice header.

According to further embodiments, for each coded view for which the count of the number of reference views exceeds zero, the respective entry of the first table comprises a flag indicating whether the relative camera parameter for each of the number of reference views of the respective coded view is present in the first table (e.g. in the VPS) or within portions of the 3D video data stream not exceeding the scope of the temporal units such as e.g. the slice headers (of a dependently coded view). In other words, entries of the first table may comprise a flag indicating whether camera parameters associated with the respective coded view are present in the respective parameter set. In further other words, it may be noted in a parameter set (e.g. in the VPS) for coded views whether relative camera parameters are present in the parameter set (e.g. the VPS) or in the temporal unit scope parameter sets (e.g. the slice headers). Moreover, entries of the first table may comprise a value indicating a count, an amount, a total or a size of the number of reference views associated with the respective coded view. Therefore, the first table may comprise for each coded view of the set of coded views a flag indicating the presence or absence of camera parameters in the respective parameter set (e.g. the VPS) and/or a count of the number of reference views of each coded view. The count of the number of reference views may be an (integer) value indicating the amount of reference views the current coded view is coded relative to. In other words, the current coded view may be coded referring to different reference views such that multiple relative camera parameters, e.g. one camera parameter for each reference view should be present in the 3D video data stream. However, the relative camera parameter of a current coded view may comprise references views that may not be used to decode the current coded view. This is advantageous, since this way relative camera parameters can be signalled in the bitstream, which may be used by other entities after decoding, such as view synthesis. Furthermore, the first table may comprise views, coded views or reference views such as base views used to decode the current coded view, but can be referred to without relative camera parameters. One camera parameter may comprise a set of scale and offset values.

According to further embodiments, for each coded view for which the count of the number of reference views exceeds zero, the respective entry of the first table comprises a second table having an entry for each of the number of reference views of the respective coded view. The second table may comprise an index indexing the respective reference view. Furthermore, the second table may comprise, if the flag indicates that the relative camera parameter for each of the number of reference views of the respective coded view is present in the first table, the relative camera parameter associated with the respective reference view of the respective coded view. In other words, the parameter set may comprise a second table having an entry for each coded view for which the associated camera parameter is indicated to be present in the parameter set (for example by the respective flag in the first table mentioned above). Each entry may comprise the camera parameter associated with the respective coded view and having a size or count indicated in the first table, wherein each of the relative camera parameters are associated with a respective reference view as indicated in the first table. In other words, the second table may comprise the actual relative camera parameters of a current coded view with respect to or associated with the respective or connected reference views indicated by the indexes. Therefore, the first table may indicate the specification or outline of the second table.

Further embodiments show that the 3D video data stream may comprise, for each coded view for which the flag indicates that the relative camera parameter for each of the number of reference views of the respective coded view is present within portions of the 3D video data stream not exceeding the scope of the temporal units, within each temporal unit encompassed by the scope of the parameter set, a temporal unit scope parameter set for the respective coded view. The temporal unit scope parameter set may comprise a third table having, for each entry of the second table (of the coded view or for each coded view), an associated entry comprising the relative camera parameter for the reference view of the respective coded view indexed by the index in the associated entry of the second table. In other words, a temporal unit scope parameter set of a current coded view may comprise, if the associated camera parameters are (indicated to be) absent or not indicated to be present in the parameter set (by e.g. the respective flag in the first table), a third table having an entry for the current coded view. The third table comprises the relative camera parameter associated with the current coded view, wherein each of the relative camera parameters are associated with the respective reference view as indicated by the index. Moreover, the set of relative camera parameters has a size or count indicated in the first table. In other words, the actual relative camera parameter may be implemented or included in (each) temporal unit of the 3D video data stream, such as for example in (each) header of the coded views such as slice headers. This is especially advantageous, if the relative camera parameters of different views are varying e.g. due to moving of a first camera with respect to a second camera. Therefore, relative camera parameters shall be decoded at least once for each slice where a relative position of different views is changed.

According to further embodiments, the relative camera parameters associated with the respective coded view are present in the parameter set, such as for example the VPS. According to further embodiments, the relative camera parameters associated with the respective coded view are present in a temporal unit scope parameter set, such as for example a slice header or a header of the temporal units. In other words, a flag indicating whether the relative camera parameters are present in the parameter set or in the temporal unit scope parameter set is not mandatory and therefore optional.

Moreover, the relative camera parameters associated with the respective coded view may be present in a temporal unit scope parameter set independent of a flag indicating where the relative camera parameters associated with the respective coded view are present in the respective parameter set. In other words, it is optional to use a flag indicating that relative camera parameters of the respective coded view are present in the respective parameter set.

According to further embodiments, the relative camera parameters comprise a pair of scale and offset values to convert depth values of the associated reference view to disparity values between the associated coded view and the associated reference view. The other way round, the relative camera parameters comprise a pair of scale and offset values to convert depth values of the associated coded view to disparity values between the associated coded view and the associated reference view. In other words, the relative camera parameters may comprise scale and offset values to enable a decoder to convert depth values of a reference view of a current coded view to disparity values between the current coded view and the associated reference view and vice versa. Therefore, a relative decoding of the current coded view with respect to the associated reference view may be performed.

BRIEF DESCRIPTION OF THE DRAWINGS

Embodiments of the present invention will be detailed subsequently referring to the appended drawings, in which:

FIG. 2 shows a schematic representation of the first table;

FIG. 5 shows an exemplarily syntax of an evaluation or an analysis of the VPS which may be performed in the decoder;

FIG. 6 shows an exemplary syntax of an evaluation or analysis of a slice segment header which may be performed in a decoder;

FIG. 11 shows an exemplary syntax of a VPS evaluation which may be performed in a known decoder; and FIG. 12 shows an exemplary syntax of a known approach to form a list comprising view order indices indicating relative dependencies of different views.

DETAILED DESCRIPTION OF THE INVENTION

In the following, embodiments of the invention will be described in further detail. Elements shown in the respective figures having the same or a similar functionality will have associated therewith the same reference signs.

Figure 1:
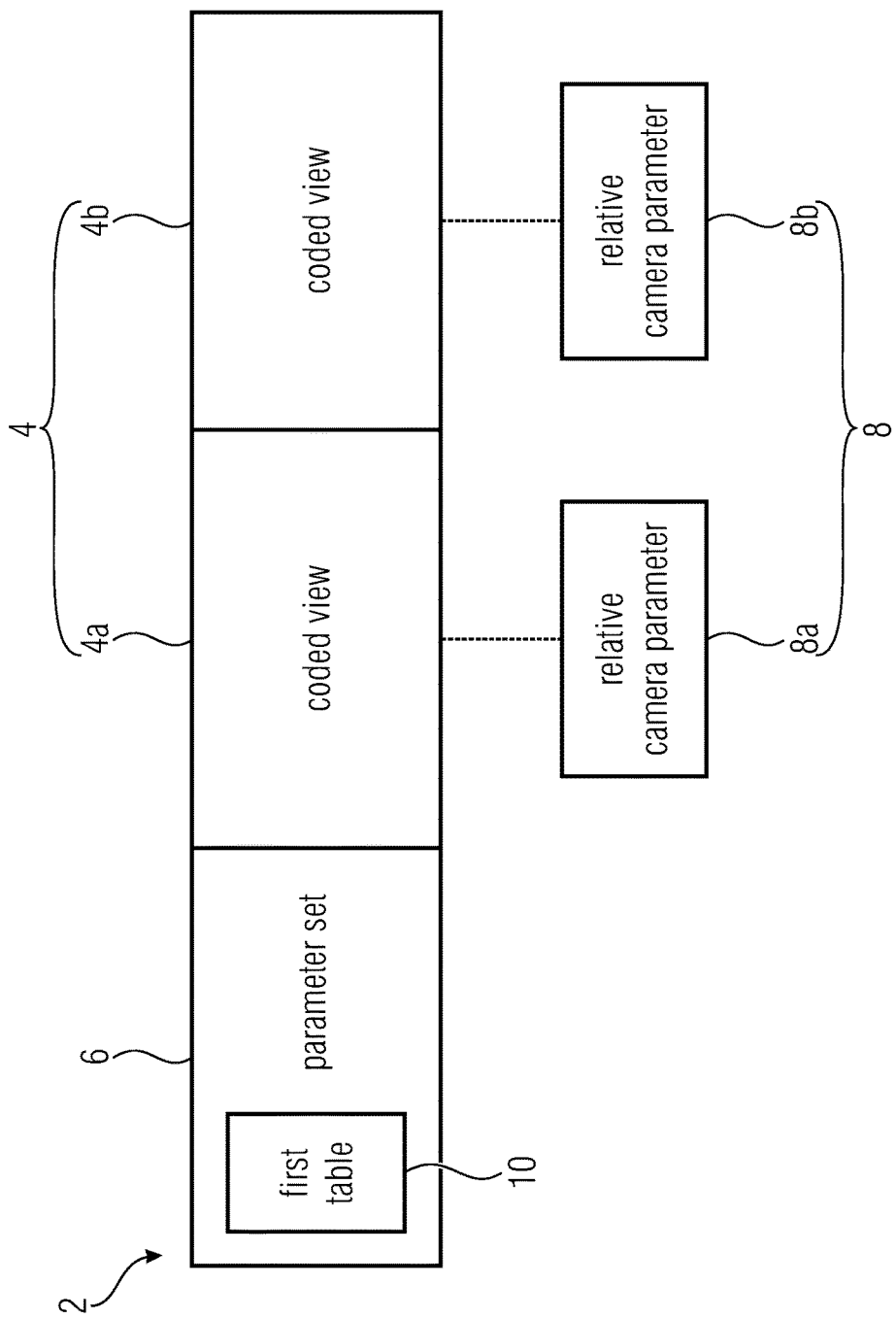
FIG. 1 shows a schematic block diagram of the 3D video data stream.

FIG. 1 shows a schematic block diagram of a 3D video data stream 2. The 3D video data stream comprises a set of coded views 4 and a parameter set 6. The set of coded views 4 is coded in the 3D video data stream in temporal units. Moreover, a parameter set 6 comprising a first table 10 having an entry for each coded view 4, 4a, 4b, which indicates by indexing for the respective coded view a number of reference views for which a relative camera parameter is present in the data stream. The scope of the parameter set 6 is beyond the scope of the temporal units, meaning that the parameter set may be encoded or transmitted once for multiple pictures, such as e.g. in the VPS. In other words, the set of coded views 4 is coded into the 3D video data stream in temporal units with one or more relative camera parameters 8 of the coded view 4 for each coded view. The temporal unit may be (a temporal size or temporal length of) one picture or one coded view. Furthermore, multiple relative camera parameters may be present (in the 3D video data stream) related to multiple reference views. Therefore, for each reference view, depth information can be converted to disparities between the reference view and the current view using the camera parameters (in the 3D video data stream). A set of relative camera parameters therefore comprises one or more camera parameters, wherein each camera parameter may comprise a scale and/or offset value.

According to embodiments, the video data stream 2 comprises, for each coded view for which the count of the number of reference views exceeds zero, the respective entry of the first table 10 comprises a flag 12 indicating whether the relative camera parameter 8 for each of the number of reference views of the respective coded view is present in the first table or within portions of the 3D video data stream not exceeding the scope of the temporal units. In other words, the parameter set 6 may comprise a first table or list 10 having an entry for each coded view. Each entry comprises for each relative camera parameter of a set of relative camera parameters 8 associated with the respective coded view 4, a value indicating an associated reference view. A schematic or exemplary representation of the table 10 is shown in FIG. 2. It is indicated in FIG. 2 that for each coded view 4a, 4b a reference view (4c and 4a respectively) is assigned by indicating the respective view order index i in column 11. In other words, table 1 indicates the association of a relative camera parameter 8 of a coded view to a respective reference view.

The parameter set 6, where the first table is part of, may be a (global, general or common) header or parameter set such as a video parameter set (VPS). Therefore, the parameter set may be beyond the scope of the temporal units, meaning that the parameter set 6 is valid for multiple temporal units, such as for example multiple coded views. Moreover, the relative camera parameter(s) may comprise for example (a pair of) scale and/or offset values. The scale and offset values may be used or applied to convert depth values of the associated reference view to disparity values between the associated coded view and the associated reference view and vice versa. Scale parameters may comprise scaling information of the 3D video and offset parameters may comprise offset information of the 3D video.

According to further embodiments, the first table 10 may further comprise for each entry (for example line or row) or at least for each entry of a coded view, a flag 12 indicating whether camera parameters 8 associated with the respective coded view 4 are present in the respective parameter set 6 such as in the second table. This flag might not be present or might be absent when the count of the number of reference views is equal to zero. In the following, the flag 12 may refer to the cp_in_slice_segment_header variable shown in the exemplary code or syntax representation of FIG. 5.

According to further embodiments, the first table 10 may comprise for each entry a value 14 indicating a count of the number of reference views associated with the respective coded view. This may be the number of reference views where the current coded view depends on. The count 14 may be indicated by a vector num_cp[i] in the exemplary syntax described in FIG. 5 and FIG. 6.

Regarding the following syntax or code fragments, the coded views may be represented by equation i=ViewOIdxList[n]. Moreover, the value indicating an associated reference view may be represented by cp_ref_voi[i][m].

Figure 3:
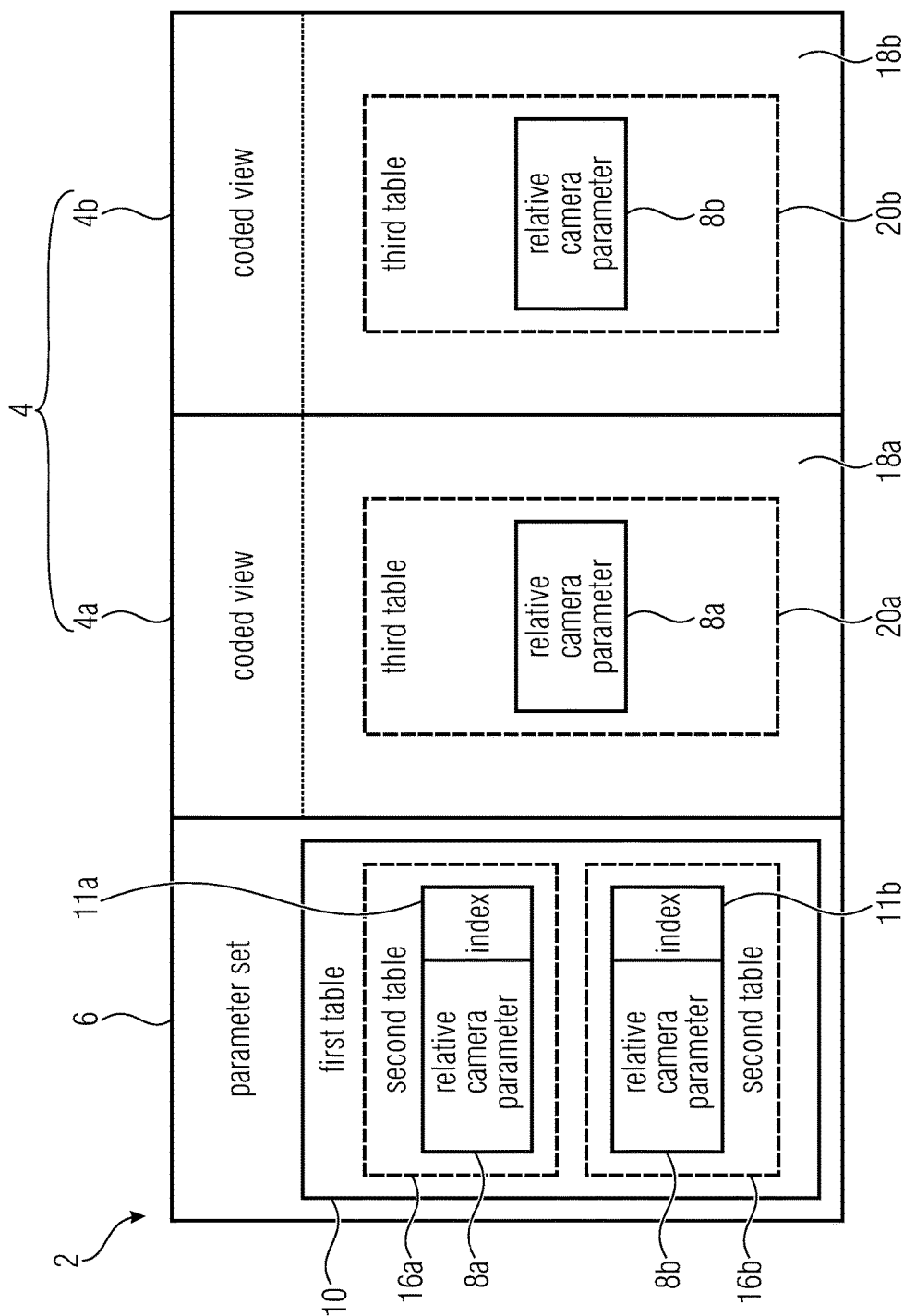
FIG. 3 shows a schematic block diagram of the 3D video data stream according to an embodiment.
Figure 4:
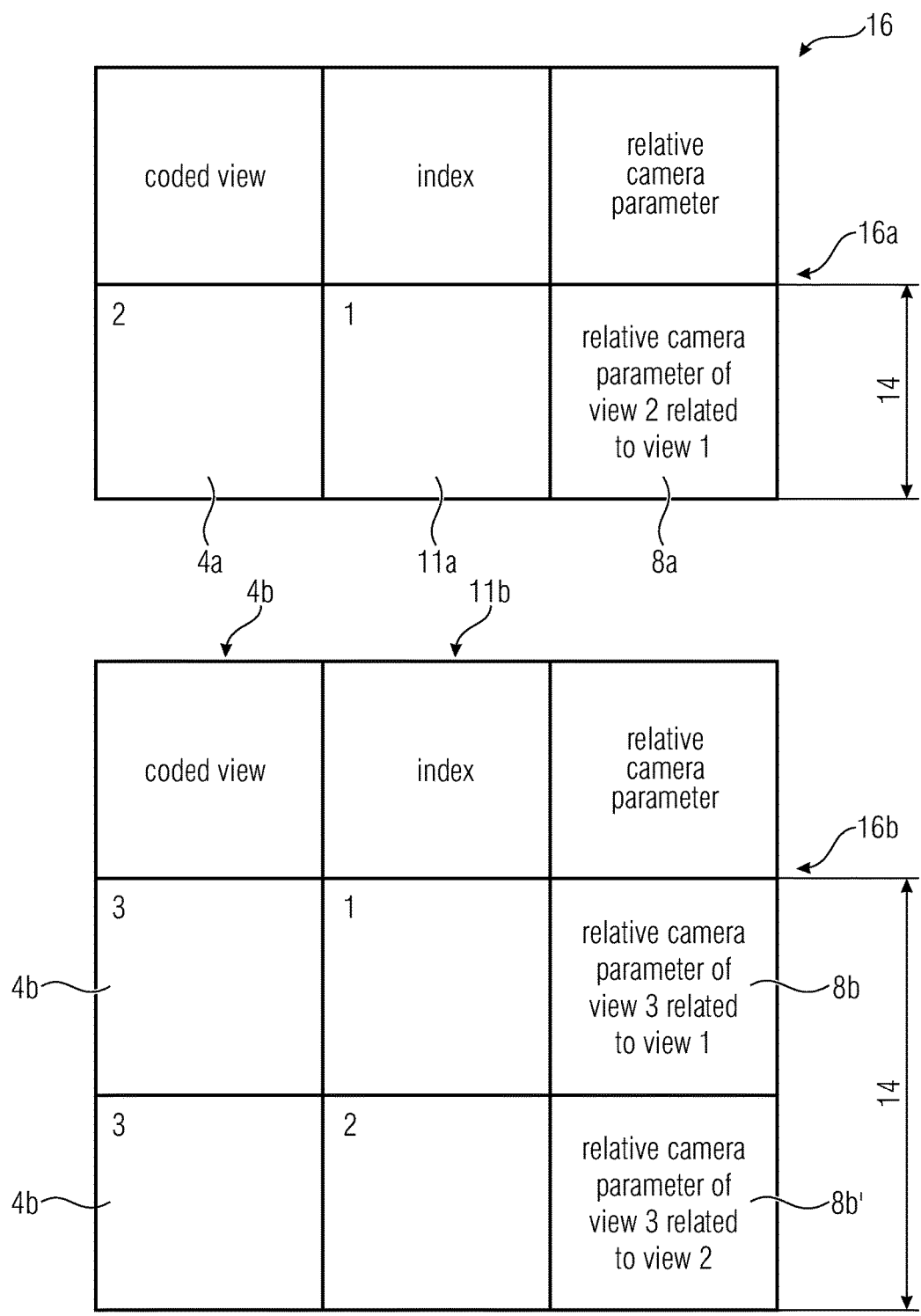
FIG. 4 shows a schematic representation of the second table.

FIG. 3 shows the 3D video data stream 2 according to an embodiment. For each coded view of the 3D video data stream, the respective entry of the first table 10 may comprise a second table 16 having an entry for each of the number of reference views of the respective coded view 4. However, the table may be absent if the count of the number of reference views does not exceed zero. The second table comprises an index indexing the respective reference view and additionally, if the flag 12 indicates that the relative camera parameter 8 for each of the number of reference views of the respective coded view is present in the first table, the relative camera parameter 8 associated with the respective reference view of the respective coded view 4. In other words, it is indicated that the parameter set 6 may comprise for each coded view where the relative camera parameter is present, a second table 16. Exemplary second tables 16a and 16b are shown in FIG. 4. The second table 16a may have an entry for the coded view 4a for which the associated camera parameter 8a is indicated to be present in the parameter set 6 such as in the first table. The indication whether reference views are present may be made by a respective binary element, such as the flag 12 in first table 10 (cf. FIG. 2).

The second table 16b shown in FIG. 4 indicates multiple reference views for each coded view. Therefore, the relative camera parameter 8b is associated with the respective coded view 4b and has a count 14 indicated in the first table 10. The size, rank or count 14 may result in a number of rows having the respective related camera parameters. Moreover, each of the relative camera parameter 8b, 8b' is associated with the respective reference view index 11b, 11b' to the reference view. In other words, the second table 16 may specify the actual data, meaning the relative camera parameter, such that each (current) coded view has access to the relative camera parameter. Linking the second tables 16a, 16b of FIG. 4 to the first table 10 of FIG. 2, the second table 16a may replace the element of the table 10 indicated by the reference sign 11a and the second table 16b may replace the element of the table 10 indicated by the reference sign 11b. Therefore, a the second tables may be referred to as a sub-table indicating that the element 11a comprises a table with the index 11a and the relative camera parameter 8a and the element 11b comprises a (2×2) table assigning the indexes 11b to the relative camera parameter 8b and 8b'.

Referring again to the syntax described for example with respect to FIGS. 5 and 6, each coded view may be represented in ViewOldxList and the set of relative camera parameters may be referred as vps_cp_scale[i] and following vps_cp_*. The respective coded view may be referred to as i=ViewOldxList[n]. Moreover, each of the relative camera parameters may be referenced by vps_cp_scale[i][j] and following vps_cp_*[i][j] and the respective reference view may be j=cp_ref_voi[i][m].

According to further embodiments and as it is shown in FIG. 3, the 3D video data stream may comprise, for each coded view, within each temporal unit encompassed by the scope of the parameter set (e.g. each slice header of a (dependently) coded view or once per picture), a temporal unit scope parameter set 18a, 18b for the respective coded view 4a, 4b. The temporal unit scope parameter set may comprise a third table 20a, 20b having, for each entry of the second table, an associated entry comprising the relative camera parameter 8 for the reference view of the respective coded view 4 indexed by the index in the associated entry (e.g. row) of the second table. Therefore, the flag 12 may indicate that the relative camera parameter 8 for each of the number of reference views of the respective coded view is present within portions of the 3D video data stream not exceeding the scope of the temporal units, such as e.g. slice headers.

In other words, a temporal unit scope parameter set 18a, 18b of a current coded view 4a, 4b may be present in temporal units of the 3D video data stream. The temporal unit scope parameter set 18a, 18b may comprise, if the associated camera parameters are (indicated to be) absent in the parameter set 6, for example by a respective flag, e.g. flag 12, a third table 20a, 20b having an entry for the current coded view 4. The third table 20a of coded view 4a may comprise the relative camera parameter 8a being associated with the respective reference view as indicated in the first table by the index 11a. Accordingly, the third table 20b of coded view 4b may comprise the relative camera parameter 8b and 8b' being associated with the respective reference view as indicated in the first table by the indexes 11b. Both, the camera parameter 8b and the camera parameter 8b' may be scale and/or offset values, the camera parameter 8b referring to (reference) view 1 4c and the relative camera parameter 8b' referring to the (reference) view 2 4a. To be more specific, the relations between the coded views and the coded views and the respective reference view(s) is still indicated in the first table, wherein the actual relative camera parameter, which may be varying over time, are provided in the temporal unit scope parameter set. Moreover, the third table has a count 14 indicated in the first table. In other further words, if e.g. the relative camera parameter are varying over time, the relative camera parameters of a coded view may be input into for example slice headers of each slice of the (dependently) coded view of a video sequence. Furthermore, it has to be noted that the reference view, indicated by reference number 4c in FIG. 2 and FIG. 4, is not shown in the 3D video data stream of FIGS. 1 and 3 since it is the first in coding order in the video sequence and can as such not use another reference view, so that it may not comprise relative camera parameters. Therefore, this reference view may be referred to as base view.

As already indicated, the temporal unit scope parameter set may be for example a slice header. The set of relative camera parameters may be referred to as cp_scale and following cp_* wherein the current coded view may be indicated by ViewIdx. Each of the relative camera parameters may be indicated by cp_scale[j] and following cp_*[j]. The reference view may be indicated by j=cp_ref_voi[ViewIdx][m] and the size indicated in the first table may be derived by num_cp[ViewIdx].

In other words, to resolve the aforementioned issues, the following changes are proposed according to embodiments. Modifications, or more specific insertions, are indicated by underlining.

1. Signal the following in the VPS for each view (with ViewOrderIdx i) present in the bitstream:
   a. The number of related views num_cp[i] for which scale and offset are present. [1]
   b. For each m in the range of 0 to num_cp[i]−1, inclusive, a syntax element cp_ref_voi[i][m] specifying the ViewOrderIdx of the m-th view related to the view with ViewOrderIdx i.
   c. When it is indicated that scales and offsets for the view with ViewOrderIdx i are present in the VPS, for each m in the range of 0 to num_cp[i]−1, inclusive, a scale and offset value pair is related to the view with ViewOrderIdx cp_ref_voi[i][m].
2. When it is indicated that scales and offsets for the view with ViewOrderIdx i are present in the slice header and the current slice header has ViewOrderIdx i, signal for each m in the range of 0 to num_cp[i]−1, inclusive, scale and offset values related to the view with ViewOrderIdx cp_ref_voi[i][m].
3. Enable tools using camera parameters only, when camera parameters are present. This is advantageous when e.g. camera parameters for a subset of views are not given at the encoder and cannot be inserted to the bitstream. In such a case a conventional 3D video data stream would need to indicate that coding tools depending on relative camera parameters are disabled for all coded views. Whereas when decoding the inventive 3D video data stream as described, the decoder would selectively disables tool, for which involved camera parameters are not present in the inventive 3D video data stream.

This more flexible signaling approach has the following benefits:

The first issue is resolved, since related views can be explicitly specified.

The second issue is resolved, since slice level signaling does not depend on ViewOldxList anymore, but only on num_cp and cp_ref_voi, which can kept unchanged for views included in the bitstream, when rewriting the VPS.

The specification (of the current 3D-HEVC draft) may be adapted as follows. Cancellations with respect to the present 3D-HEVC draft [2], are indicated using crossing out wherein insertions are indicated using underlining of the respective text. A possible syntax of the VPS is shown in FIG. 5.

cp_precision specifies the precision of vps_cp_scale[i][j], vps_cp_off[i][j], vps_cp_inv_scale_plus_scale[i][j], and vps_cp_inv_off_plus_off[i][j] in the VPS and cp_scale[j], cp_off[j], cp_inv_scale_plus_scale[j], and cp_inv_off_plus_off[j] in the slice segment header. The value of cp_precision shall be in the range of 0 to 5, inclusive.

num_cp[i] specifies the number of camera parameters signaled for the view with ViewIdx equal to i. The length of the num_cp[i] syntax element is Ceil(Log 2(NumViews)) bits. The value of num_cp[i] shall be in the range of 0 to NumViews−1, inclusive.

cp_ref_voi[m] specifies the ViewIdx of the view to which the m-th camera parameters signaled for the view with ViewIdx equal to i are related to. The value of cp_ref_voi[i][m] shall be in the range of 0 to 65535. It is a requirement of bitstream conformance that cp_ref_voi[i][x] is not equal to cp_ref_voi[i][y] for any value of x and y in the range of 0 to num_cp[i]−1.

For i and j in the range of 0 to NumViews−1, inclusive, the variable CpPresentFlag[i][j] is set equal to 0 and modified as specified in the following:

```
for( n = 1; n < NumViews; n++ ) {
    i = ViewOldxList[ n ]
    for( m = 0; m < num_cp[ i ]; m++ )
        CpPresentFlag[ i ][ cp_ref_voi[ i ][ m ] ] = 1
}
``` cp_in_slice_segment_header_flag[i] equal to 1 specifies that the syntax elements vps_cp_scale[i][j], vps_cp_off[i][j], vps_cp_inv_scale_plus_scale[i][j], and vps_cp_inv_off_plus_off[i][j] are not present in the VPS and that the syntax elements cp_scale[j], cp_off[j], cp_inv_scale_plus_scale[j], and cp_inv_off_plus_off[j] are present in slice segment headers with nuh_layer_id equal to layerId and ViewOrderIdx[layerId] equal to i. cp_in_slice_segment_header_flag equal to 0 specifies that the vps_cp_scale[i][j], vps_cp_off[i][j], vps_cp_inv_scale_plus_scale[i][j], and vps_cp_inv_off_plus_off[i][j] syntax elements are present in the VPS and that the syntax elements cp_scale[j], cp_off[j], cp_inv_scale_plus_scale[j], and cp_inv_off_plus_off[j] are not present in slice segment headers with nuh_layer_id equal to layerId and ViewOrderIdx[layerId] equal to i. When not present, the value of cp_in_slice_segment_header_flag[i] is inferred to be equal to 0.

vps_cp_scale[i][j], vps_cp_off[i][j], vps_cp_inv_scale_plus_scale[i][j], and vps_cp_inv_off_plus_off[i][j] specify conversion parameters for converting a depth value to a disparity value and might be used to infer the values of cp_scale[j], cp_off[j], cp_inv_scale_plus_scale[j], and cp_inv_off_plus_off[j] for the i-th view specified in VPS. When the i-th view contains both a texture view and a depth view, the conversion parameters are associated with the texture view.

Furthermore, the general slice header semantics, as e.g. specified in 1.7.4.7.1 of the standard, may be applied as described below. A possible syntax of the slice segment header is shown in FIG. 6.

The specifications in clause F.7.4.7.1 (of the standard) may apply with the following modifications and additions.

The variable DepthFlag is set equal to VpsDepthFlag[nuh_layer_id] and the variable ViewIdx is set equal to ViewOrderIdx[nuh_layer_id].

The variables depthOfRefViewsAvailFlag, textOfCurViewAvailFlag, and cpAvailableFlag are set equal to 0 and modified as specified in the following:

If DepthFlag is equal to 0, depthOfRefViewsAvailFlag and cpAvailableFlag are set equal to 1 and the following applies:
 For i in the range of 0 to NumRefListLayers[nuh_layer_id]−1, inclusive, the following applies:
  The variable refViewIdx is set equal to ViewOrderIdx[IdRefListLayer[nuh layer id][i]].
  When CpPresentFlag[ViewIdx][refViewIdx] is equal to 0, cpAvailableFlag is set equal to 0.
  The variable curDepthAvailableFlag is set equal to 0.
  For j in the range of 0 to MaxLayersMinus1, inclusive, the following applies:
   When all of the following conditions are true, curDepthAvailableFlag is set equal to 1:
    direct_dependency_flag[LayerIdxInVps[nuh_layer_id]][j] is equal to 1
    VpsDepthFlag[layer_id_in_nuh[j]] is equal to 1
    ViewOrderIdx[layer_id_in_nuh[j]] is equal to ViewOrderIdx[IdRefListLayer[nuh_layer_id][i]]
    DependencyId[layer_id_in_nuh[j]] is equal to 0
    AuxId[layer_id_in_nuh[j]] is equal to 0
  When curDepthAvailableFlag is equal to 0, depthOfRefViewsAvailFlag is set equal to 0.
Otherwise (DepthFlag is equal to 1), the following applies:
 For j in the range of 0 to MaxLayersMinus1, inclusive, the following applies:
  When all of the following conditions are true, textOfCurViewAvailFlag is set equal to 1:
   direct_dependency_flag[LayerIdxInVps[nuh_layer_id]][j] is equal to 1
   VpsDepthFlag[layer_id_in_nuh[j]] equal to 0
   ViewOrderIdx[layer_id_in_nuh[j]] equal to ViewIdx
   DependencyId[layer_id_in_nuh[j]] is equal to 0
   AuxId[layer_id_in_nuh[j]] is equal to 0

The variables IvMvPredFlag, IvMvScalingFlag, SubPbSize, IvResPredFlag, ViewSynthesisPredFlag, DepthBasedBlkPartFlag, DepthRefinementFlag, MpiSubPbSize, IntraContourFlag, IntraSdcWedgeFlag, QtPredFlag, InterSdcFlag and DisparityDerivationFlag are derived as specified in the following:

IvMvPredFlag=(nuh_layer_id>0)&& NumRefListLayers[nuh_layer_id]>0&&iv_mv_pred_flag[DepthFlag]   (I-12)

IvMvScalingFlag=(nuh_layer_id>0)&&iv_mv_scaling_flag[DepthFlag]  (I-13)

SubPbSize=1<<(nuh_layer_id>0? log 2_sub_pb_size_minus3[DepthFlag]+3:CtbLog2SizeY)  (I-14)

IvResPredFlag=(nuh_layer_id>0)&&NumRefListLayers[nuh_layer_id]>0&&iv_res_pred_flag[DepthFlag]  (I-15)

ViewSynthesisPredFlag=(nuh_layer_id>0)&&NumRefListLayers[nuh_layer_id]>0&&view_synthesis_pred_flag[DepthFlag]&&depthOfRefViewsAvailFlag&&cpAvailableFlag  (I-16)

DepthBasedBlkPartFlag=(nuh_layer_id>0)&&depth_based_blk_part_flag[DepthFlag]&&depthOfRefViewsAvailFlag  (I-17)

DepthRefinementFlag=(nuh_layer_id>0)&&depth_refinement_flag[DepthFlag]&&depthOfRefViewsAvailFlag&&cpAvailableFlag  (I-18)

MpiFlag=(nuh_layer_id>0)&&mpi_flag[DepthFlag]&&textOfCurViewAvailFlag  (I-19)

MpiSubPbSize=1<<(log 2_mpi_sub_pb_size_minus3[DepthFlag]+3)  (I-20)

IntraContourFlag=(nuh_layer_id>0)&&intra_contour_flag[DepthFlag]&&textOfCurViewAvailFlag  (I-21)

IntraSdcWedgeFlag=(nuh_layer_id>0)&&intra_sdc_wedge_flag[DepthFlag]  (I-22)

QtPredFlag=(nuh_layer_id>0)&&qt_pred_flag[DepthFlag]&&textOfCurViewAvailFlag  (I-23)

InterSdcFlag=(nuh_layer_id>0)&&inter_sdc_flag[DepthFlag]  (I-24)

IntraSingleFlag=(nuh_layer_id>0)&&intra_single_flag[DepthFlag]  (I-25)

cp_scale[j]cp_off[j], cp_inv_scale_plus_scale[j], and cp_inv_off_plus_off[j] specify conversion parameters for converting a depth value to a disparity value. When not present, the values of cp_scale[j], cp_off[j], cp_inv_scale_plus_scale[j], and cp_inv_off_plus_off[j], are inferred to be equal to vps_cp_scale[ViewIdx][j], vps_cp_off[ViewIdx][j], vps_cp_inv_scale_plus_scale[ViewIdx][j], and vps_cp_inv_off_plus_off[ViewIdx], respectively. It is a requirement of bitstream conformance, that the values of cp_scale[j], cp_off [j], cp_inv_scale_plus_scale[j], and cp_inv_off_plus_off[j] in a slice segment header having a ViewIdx equal to viewIdxA and the values of cp_scale[j], cp_off[j], cp_inv_scale_plus_scale[j], and cp_inv_off_plus_off[j] in a slice segment header having a ViewIdx equal to viewIdxB shall be the same, when viewIdxA is equal to viewIdxB.

The array DepthToDisparityB[j][d] specifying the disparity between the current view and the view with ViewIdx equal j corresponding to the depth value d in the view with ViewIdx equal to j and the array DepthToDisparityF[j][d] specifying the disparity between the view with ViewIdx equal j and the current view corresponding to the depth value d in the current view is derived as specified in the following:

The variable log 2 Div is set equal to $BitDepth_y-1+cp\_precision$.

For d in range of 0 to $((1<<BitDepth_y)-1)$, inclusive, the following applies:
For i in the range of 0 to ViewIdx−1, inclusive, the following applies:

$$offset=(cp\_off[j]<<BitDepth_y)+((1<<\log 2\ Div)>>1) \quad (I\text{-}31)$$

$$scale=cp\_scale[j] \quad (I\text{-}32)$$

$$DepthToDisparityB[j][d]=(scale*d+offset)>>\log 2\ Div \quad (I\text{-}33)$$

$$invOffset=((cp\_inv\_off\_plus\_off[j]-cp\_off[j])<<BitDepth_y)+((1<<\log 2\ Div)>>1) \quad (I\text{-}34)$$

$$invScale=(cp\_inv\_scale\_plus\_scale[j]-cp\_scale[j]) \quad (I\text{-}35)$$

$$DepthToDisparityF[j][d]=(invScale*d+invOffset)>>\log 2\ Div \quad (I\text{-}36)$$

Figure 7:
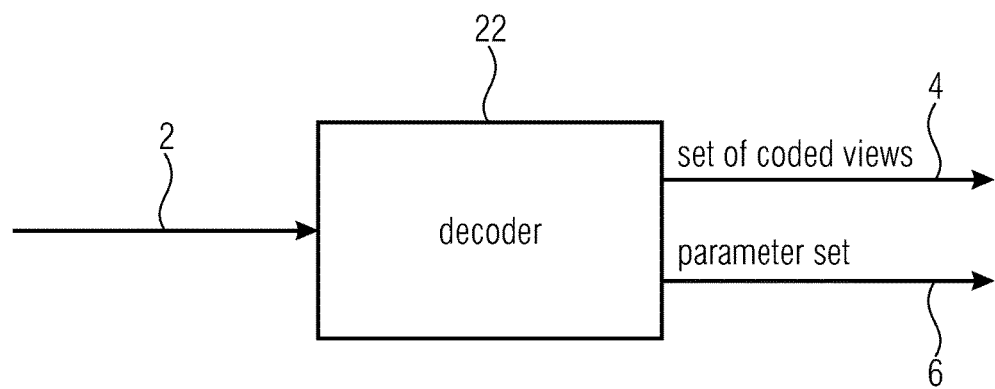
FIG. 7 shows a schematic block diagram of a decoder for decoding a 3D video from a 3D video data stream.

FIG. 7 shows a schematic representation of a decoder 22 for decoding a 3D picture 24 from the 3D video data stream 2. The decoder 22 is configured to decode the set of coded views 4 from the 3D video data stream 2 in temporal units. Furthermore, the decoder is configured to derive the parameter set 6 comprising the first table having an entry for each coded view from the 3D video data stream, wherein the first table indicates by indexing for the respective coded view a number of reference views for which a the relative camera parameter is present in the data stream. The scope of the parameter set 6, such as an instance of the parameter set, is beyond the scope of the temporal units, e.g. coded in the VPS. Moreover, the decoder or a view synthesizer may be configured to form a 3D picture from the decoded set of coded views using the first table. In other words, the decoder is configured to decode the 3D video data stream 2. A sequence of 3D pictures may form a 3D video.

According to embodiments, the first table may comprise a flag indicating whether the relative camera parameter 8 for each coded view for which the count of the number of reference views exceeds zero is present in the first table or within portions of the 3D video data stream not exceeding the scope of the temporal units. Moreover, the first table may comprise a second table 16 for each coded view for which the count of the number of reference views exceeds zero. The second table has an entry for each of the number of reference views of the respective coded view 4. This entry comprises an index indexing the respective reference view and optionally, if the flag 12 indicates that the relative camera parameter (8) for each of the number of reference views of the respective coded view is present in the first table, the relative camera parameter 8 associated with the respective reference view of the respective coded view 4.

A further embodiment shows the decoder to derive for each coded view for which the flag 12 indicates that the relative camera parameter 8 for each of the number of reference views of the respective coded view is present within portions of the 3D video data stream not exceeding the scope of the temporal units, the relative camera parameter 8 for the reference view of the respective coded view 4 indexed by the index in the associated entry from the second table. In other words, if it is indicated that the relative camera parameter are located in the VPS, the decoder may derive or read these relative camera parameter. Nonetheless, if the flag indicates that the relative camera parameter are not present in the VPS and that the same are therefore present e.g. in slice headers, the decoder may derive for each coded view within each temporal unit encompassed by the scope of the parameter set, a third table 20a, 20b having, for each entry of the second table, an associated entry comprising the relative camera parameter 8 for the reference view of the respective coded view 4 indexed by the index in the associated entry of the second table. However, it may be indicated by the flag 12 whether the relative camera parameter 8 for each of the number of reference views of the respective coded view is present within portions of the 3D video data stream not exceeding the scope of the temporal units.

Further embodiments relate to the use of coding tools. Therefore, the decoder may, if a count of the relative camera parameter of a coded view exceeds zero, e.g. if the flag indicates whether the relative camera parameter 8 for each coded view for which the count of the number of reference views exceeds zero is present in the first table or within portions of the 3D video data stream not exceeding the scope of the temporal units, apply a coding tool using the relative camera parameter to form the 3D video data stream using the relative camera parameter. In other words, the decoder monitors the presence or the absence or relative camera parameter. Based on an information whether a specific coding tool needs such a relative camera parameter or not, the decoder may only apply those coding tools to the 3D video data stream where the requirement regarding the relative camera parameter is fulfilled. In this case, if a coding tools needs or uses a relative camera parameter and if this relative camera parameter is present, e.g. if the flag 12 is present or if the count of the number of reference views is greater than zero, the decoder may access the relative camera parameter in a second table 16.

In further other words, the decoder may analyze the VPS to derive the first table including for each coded view: the number of reference views for which relative camera parameters are present for the coded view; if the number of reference views for which relative camera parameters are present for the coded view is greater than zero, a flag indicating whether the relative camera parameters for the coded view are present in the VPS or in the slice headers; if number of reference views for which relative camera parameters are present is greater than zero, the view index values of the reference views for which relative camera parameters are present for the coded view.

Furthermore, the decoder may analyze the VPS to derive the second table. Or more specifically, the decoder may read the relative camera parameters associated with coded views for which relative camera parameters are indicated by the flag in the first table to be present in VPS from the VPS.

Furthermore, the decoder may analyze slice headers of a coded view to derive the third table. Or more specifically, if the relative camera parameters for the coded view are indicated by the flag in the first table to be present in slice headers, the decoder may read the relative camera parameters associated with the coded view from the slice headers of the coded view.

Based on the view index values of the reference views of a particular coded view read from the first table, the decoder may furthermore disable and enable coding tools involving relative camera parameters associated with the particular reference views and the particular coded view.

Based on the view index values of the reference views of a particular coded view read from the first table, the decoder may furthermore select from the second or third table the relative camera parameters a coding tool may use for decoding of the particular coded view.

Figure 8:
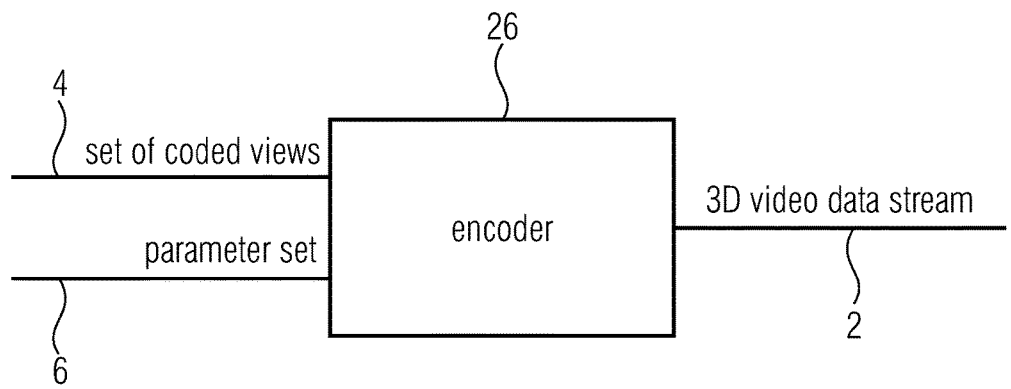
FIG. 8 shows a schematic block diagram of an encoder for encoding 3D video data into a 3D video data stream.

FIG. 8 shows a schematic representation of an encoder 26 for encoding 3D video data into a 3D video data stream. The encoder 26 is configured to encode a set of coded views 4 from the 3D video data into the 3D video data stream in temporal units. The Encoder is further configured to encode a parameter set 6 comprising a first table having an entry for each coded view, which indicates by indexing for the respective coded view a number of reference views for which a relative camera parameter is present in the data stream, wherein a scope of the parameter set 6 is beyond the scope of the temporal units.

According to an embodiment, the encoder is configured to form the first table comprising a flag indicating whether the relative camera parameter 8 for each coded view for which the count of the number of reference views exceeds zero is present in the first table or within portions of the 3D video data stream not exceeding the scope of the temporal units. Therefore, for each coded view for which the count of the number of reference views exceeds zero, the respective entry of the first table 10 comprises a second table 16 having an entry for each of the number of reference views of the respective coded view 4. Such an entry comprises an index indexing the respective reference view and optionally, if the flag 12 indicates that the relative camera parameter 8 for each of the number of reference views of the respective coded view is present in the first table, the relative camera parameter 8 associated with the respective reference view of the respective coded view 4.

According to a further embodiment, the encoder is configured to encode for each coded view for which the flag 12 indicates that the relative camera parameter 8 for each of the number of reference views of the respective coded view is present within portions of the 3D video data stream not exceeding the scope of the temporal units, the relative camera parameter 8 for the reference view of the respective coded view 4 indexed by the index in the associated entry in the second table. In other words, if for a coded view, constant or non-varying relative camera parameter are present, the encoder may provide these relative camera parameter in the VPS.

Further embodiments show the encoder configured to encode for each coded view for which the flag 12 indicates that the relative camera parameter 8 for each of the number of reference views of the respective coded view is present within portions of the 3D video data stream not exceeding the scope of the temporal units within each temporal unit encompassed by the scope of the parameter set, a third table 20a, 20b having, for each entry of the second table, an associated entry comprising the relative camera parameter 8 for the reference view of the respective coded view 4 indexed by the index in the associated entry of the second table. In other words, if for a coded view, varying relative camera parameter are present, the encoder may provide these relative camera parameter in slice header.

According to a further embodiment, the encoder may, if a count of the relative camera parameter of a coded view exceeds zero, e.g. if the flag indicates whether the relative camera parameter 8 for each coded view for which the count of the number of reference views exceeds zero is present in the first table or within portions of the 3D video data stream not exceeding the scope of the temporal units, the encoder is configured to apply a coding tool using the relative camera parameter to form the 3D video data stream dependent on the occurrence of the relative camera parameter. In other words, if a relative camera parameter are present in general, the encoder may use coding tools for encoding the 3D video data. The decoder may, based on the absence or presence of the respective relative camera parameter, use the same coding tools for decoding the 3D video data stream. However, the encoder may access the relative camera parameter in a second table or in a third table if the relative camera parameter is used by the coding tool.

Figure 9:
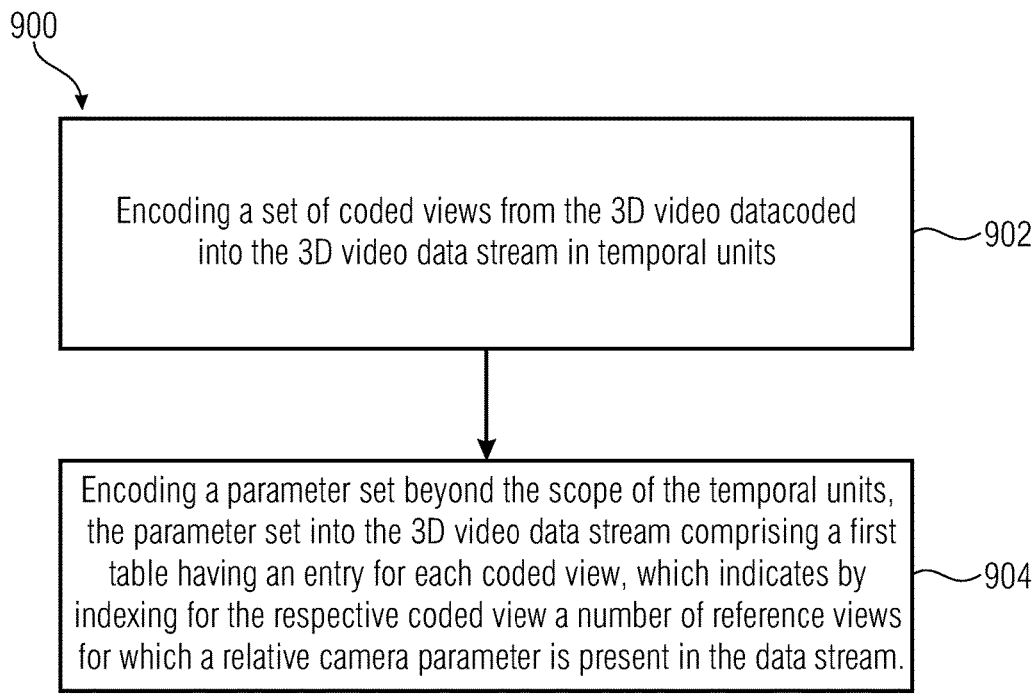
FIG. 9 shows a schematic block diagram of a method for encoding a 3D video data stream.

FIG. 9 shows a method 900 for encoding a 3D video data stream according to an embodiment. The method 900 comprises a step 902 of encoding a set of coded views from the 3D video data into the 3D video data stream and temporal units, and a step 904 of encoding a parameter set beyond the scope of the temporal units into the 3D video data stream comprising a first table having an entry for each coded view which indicates by indexing for the respective coded view a number of reference views for which a relative camera parameter is present in the data stream.

Figure 10:
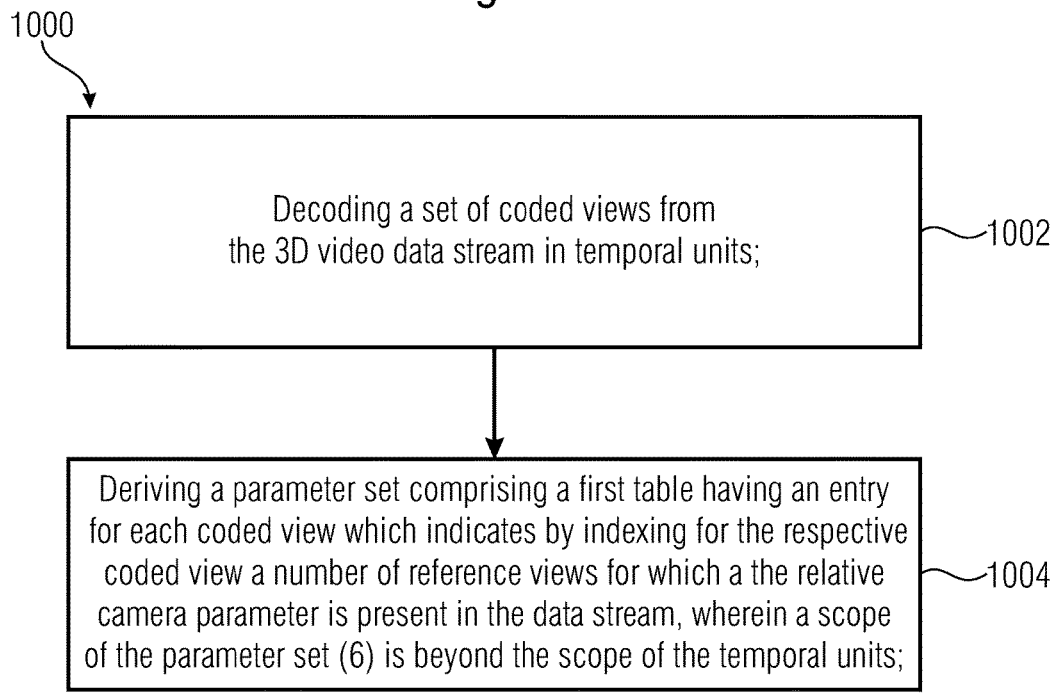
FIG. 10 shows a schematic block diagram of a method for decoding a 3D video data stream.

FIG. 10 shows a method 1000 of decoding a 3D video data stream according to an embodiment. The method 1000 comprises a step 1002 of decoding a set of coded views from the 3D video data stream in temporal units, and a step 1004 of deriving a parameter set comprising a first table having an entry for each coded view which indicates by indexing for the respective coded view a number of reference views for which a the relative camera parameter is present in the data stream, wherein a scope of the parameter set (6) is beyond the scope of the temporal units.

Further embodiments of the invention relate to the following examples:

A 3D video data stream (2) comprising:
- a set of coded views (4, 4a, 4b) in temporal units with a relative camera parameter (8, 8a, 8b) of the coded view (4a, 4b) of the set of coded views for each coded view;
- a parameter set (6) comprising a first table (10) having an entry for each coded view (4, 4a, 4b), each entry comprising for each relative camera parameter of a set of relative camera parameters (8a, 8b) associated with the respective coded view (4a, 4b), a value (11, 11a, 11b) indicating an associated reference view.

2. The 3D video data stream (2) according to example 1, wherein the parameter set (6) is beyond the scope of the temporal units.

3. The 3D video data stream (2) according to one of examples 1 or 2, wherein each entry of the first table (10) comprises a flag (12) indicating whether the camera parameter (8) associated with the respective coded view is present in the respective parameter set.

4. The 3D video data stream (2) according to one of examples 1 to 3, wherein each entry of the first table (10) comprises a value indicating a size (14) of the set of relative camera parameters associated with the respective coded view.

5. The 3D video data stream (2) according to one of examples 1 to 4, wherein the parameter set (6) comprises a second table (16) having an entry for each coded view (4) for which the associated camera parameters (8) are present in the parameter set (6), each entry comprising the set of relative camera parameters (8) associated with the respective coded view (4) and having a size (14) indicated in the first table (10), wherein each of the relative camera parameters (8) are associated with the respective reference view as indicated in the first table (10).

6. The 3D video data stream (2) according to one of examples 1 to 5, comprising a temporal unit scope parameter set (18a, 18b) of a current coded view (4a, 4b), the temporal unit scope parameter set comprising if the associated camera parameters (8a, 8b) are absent in the parameter set (6), a third table (20a, 20b) having an entry for the current coded view (4a, 4b), the third table comprising a set of relative camera parameters (8a, 8b) associated with the current coded view (4a, 4b), wherein each of the relative camera parameters being associated with the respective reference view as indicated in the first table (10), and wherein the set of relative camera parameters has a size (14) indicated in the first table.

7. The 3D video data stream according to one of examples 1 to 6, wherein the camera parameters (8) associated with the respective coded view (4) are present in the parameter set (6).

8. The 3D video data stream (2) according to one of examples 1 to 7, wherein the camera parameters (8) associated with the respective coded view (4) are present in a temporal unit scope parameter set (18a, 18b).

9. The 3D video data stream according to one of examples 1 to 8, wherein the camera parameters (8) associated with the respective coded view (4) are present in a temporal unit scope parameter set (18a, 18b) independent of a flag indicating whether camera parameters (8) associated with the respective coded view (4) are present in the respective temporal unit scope parameter set (18a, 18b).

10. The 3D video data stream (2) according to one of examples 1 to 9, wherein the relative camera parameter (8) comprises a pair of scale and offset values to convert depth values of the associated reference view to disparity values between the associated coded view and the associated reference view.

11. The 3D video data stream (2) according to one of examples 1 to 10, wherein the relative camera parameter comprises a pair of scale and offset values to convert depth values of the associated coded view to disparity values between the associated coded view and the associated reference view.

12. The 3D video data stream (2) according to one of examples 1 to 11, wherein the relative camera parameters (8) are changing in the temporal units of the 3D video data stream (2).

13. A decoder (22) for decoding a 3D video (24) from a 3D video data stream (2),
wherein the decoder (22) is configured to decode a set of coded views (4) from the 3D video data stream (2) in temporal units with relative camera parameters of a coded view of the set of coded views for each coded view;
wherein the decoder (22) is configured to decode a parameter set (6) comprising a first table having an entry for each coded view from the 3D video data stream (2), each entry comprising for each of a set of relative camera parameters associated with the respective coded view, a value indicating an associated reference view; and
wherein the decoder (22) is configured to form the 3D video (24) from the decoded set of coded views using the values indicating an associated reference view in the first table.

14. An encoder (26) for encoding 3D video data into a 3D video data stream (2), wherein the encoder (26) is configured to encode a set of coded views (4) from the 3D video data into the 3D video data stream (2) in temporal units with relative camera parameters of a coded view of the set of coded views for each coded view and wherein the encoder (26) is further configured to encode a parameter set (6) comprising a first table having an entry for each coded view (4), each entry comprising for each of a set of relative camera parameters associated with the respective coded view, a value indicating an associated reference view.

15. Method (1000) for decoding a 3D video data stream, the method (1000) comprising:
- decoding a set of coded views from the 3D video data stream in temporal units with relative camera parameters of a coded view of the set of coded views for each coded view;
- decoding a parameter from the 3D video data stream comprising a first table having an entry for each coded view, each entry comprising for each of a set of relative camera parameters associated with the respective coded view a value indicating an associated reference view.

16. Method (900) for encoding a 3D video data stream, the method (900) comprising:
- encoding a set of coded views coded into the 3D video data stream in temporal units with relative camera parameters of a coded view of the set of coded views for each coded view;
- encoding a parameter set into the 3D video data stream comprising a first table having an entry for each coded view, each entry comprising for each of a set of relative camera parameters associated with the respective coded view, a value indicating an associated reference view.

17. Computer program for performing, when running on a computer or a processor, the method of example 15 or 16.

It is to be understood that in this specification, the signals on lines are sometimes named by the reference numerals for the lines or are sometimes indicated by the reference numerals themselves, which have been attributed to the lines. Therefore, the notation is such that a line having a certain signal is indicating the signal itself. A line can be a physical line in a hardwired implementation. In a computerized implementation, however, a physical line does not exist, but the signal represented by the line is transmitted from one calculation module to the other calculation module.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Y.-L. Chang, Y.-P. Tsai, S. Lei, D. Tian, A. Vetro, "3D-HEVC HLS: Camera parameter signaling and Depth reference selection"; JCT3V-D0140
[2] G. Tech, K. Wegner, Y. Chen, S. Yea, "3D-HEVC Draft Text 6"; JCT3V-J1001

The invention claimed is:

1. A non-transitory computer-readable storage medium storing a 3D video data stream comprising:
a set of coded views coded in the 3D video data stream in temporal units; and
a parameter set comprising a first table comprising an entry for each coded view, which comprises
a value indicating a count of a number of reference views,
for each coded view for which the count of the number of reference views exceeds zero,
a flag indicating whether, for each of the number of reference views of the respective coded view, a relative camera parameter associated with the respective reference view is present in the first table or within portions of the 3D video data stream not exceeding the scope of the temporal units,
for each of the number of reference views of the respective coded view,
an index indexing the respective reference view, and
if the flag indicates that, for each of the number of reference views of the respective coded view, the relative camera parameter associated with the respective reference view is present in the first table, the relative camera parameter associated with the respective reference view of the respective coded view,
wherein a scope of the parameter set is beyond the scope of the temporal units,
wherein the 3D video data stream further comprises, for each coded view for which the flag indicates that, for each of the number of reference views of the respective coded view, the relative camera parameter associated with the respective reference view is present within the portions of the 3D video data stream not exceeding the scope of the temporal units,
within each temporal unit encompassed by the scope of the parameter set,
a temporal unit scope parameter set for the respective coded view, the temporal unit scope parameter set comprising a second table comprising, for each of the number of reference views of the respective coded view, an associated entry comprising
the relative camera parameter associated with the reference view of the respective coded view indexed by the index indexing the respective reference view,
wherein the relative camera parameter comprises
a pair of scale and offset values to convert depth values of the associated reference view to disparity values between the coded view for which the relative camera parameter is present in the 3D video data stream and the reference view with which the relative camera parameter is associated.

2. A decoder,
wherein the decoder comprises a electronic circuit or microprocessor configured to, or a computer programmed to,
decode from a 3D video data stream a set of coded views which is coded in the 3D video data stream in temporal units; and
decode from the 3D video data stream a parameter set comprising a first table comprising an entry for each coded view, which comprises
a value indicating a count of a number of reference views,
for each coded view for which the count of the number of reference views exceeds zero,
a flag indicating whether, for each of the number of reference views of the respective coded view, a relative camera parameter associated with the respective reference view is present in the first table or within portions of the 3D video data stream not exceeding the scope of the temporal units,
for each of the number of reference views of the respective coded view
an index indexing the respective reference view, and
if the flag indicates that, for each of the number of reference views of the respective coded view, the relative camera parameter associated with the respective reference view is present in the first table, the relative camera parameter associated with the respective reference view of the respective coded view,
wherein a scope of the parameter set is beyond the scope of the temporal units
decode from the 3D video data stream, for each coded view for which the flag indicates that, for each of the number of reference views of the respective coded view, the relative camera parameter associated with the respective reference view is present within portions of the 3D video data stream not exceeding the scope of the temporal units,
within each temporal unit encompassed by the scope of the parameter set
a temporal unit scope parameter set for the respective coded view, the temporal unit scope parameter set comprising a second table comprising, for each of the number of reference views of the respective coded view, an associated entry comprising
the relative camera parameter associated with the reference view of the respective coded view indexed by the index indexing the respective reference view,
wherein the relative camera parameter comprises a pair of scale and offset values, and the decoder is configured to use the relative camera parameter to convert depth values of the associated reference view to disparity values between the coded view for which the relative camera parameter is present in the 3D video data stream and the reference view with which the relative camera parameter is associated.

3. An encoder, wherein the encoder comprises a electronic circuit or microprocessor configured to, or a computer programmed to,
encode into a 3D video data stream a set of coded views in temporal units; and
encode into the 3D video data stream a parameter set comprising a first table comprising an entry for each coded view, which comprises
a value indicating a count of a number of reference views, for each coded view for which the count of the number of reference views exceeds zero,
a flag indicating whether, for each of the number of reference views of the respective coded view, a relative camera parameter associated with the respective reference view is present in the first table or within portions of the 3D video data stream not exceeding the scope of the temporal units,
for each of the number of reference views of the respective coded view
an index indexing the respective reference view, and
if the flag indicates that, for each of the number of reference views of the respective coded view, the relative camera parameter associated with the respective reference view is present in the first table, the relative camera parameter associated with the respective reference view of the respective coded view,
wherein a scope of the parameter set is beyond the scope of the temporal units,
encode into the 3D video data stream, for each coded view for which the flag indicates that, for each of the number of reference views of the respective coded view, the relative camera parameter associated with the respective reference view is present within portions of the 3D video data stream not exceeding the scope of the temporal units,
within each temporal unit encompassed by the scope of the parameter set
a temporal unit scope parameter set for the respective coded view, the temporal unit scope parameter set comprising a second table comprising, for each of the number of reference views of the respective coded view, an associated entry comprising
the relative camera parameter associated with the reference view of the respective coded view indexed by the index indexing the respective reference view,
wherein the relative camera parameter comprises a pair of scale and offset values to convert depth values of the associated reference view to disparity values between the coded view for which the relative camera parameter is present in the 3D video data stream and the reference view with which the relative camera parameter is associated.

4. A method for decoding a 3D video data stream, the method comprising:
decoding from a 3D video data stream a set of coded views from the 3D video data stream in temporal units;
decoding from the 3D video data stream a parameter set comprising a first table comprising an entry for each coded view, which comprises
a value indicating a count of a number of reference views,
for each coded view for which the count of the number of reference views exceeds zero,
a flag indicating whether, for each of the number of reference views of the respective coded view, a relative camera parameter associated with the respective reference view is present in the first table or within portions of the 3D video data stream not exceeding the scope of the temporal units,
for each of the number of reference views of the respective coded view
an index indexing the respective reference view, and
if the flag indicates that, for each of the number of reference views of the respective coded view, the relative camera parameter associated with the respective reference view is present in the first table, the relative camera parameter associated with the respective reference view of the respective coded view,
wherein a scope of the parameter set is beyond the scope of the temporal units, decoding from the 3D video data stream, for each coded view for which the flag indicates that, for each of the number of reference views of the respective coded view, the relative camera parameter associated with the respective reference view is present within portions of the 3D video data stream not exceeding the scope of the temporal units,
within each temporal unit encompassed by the scope of the parameter set
a temporal unit scope parameter set for the respective coded view, the temporal unit scope parameter set comprising a second table comprising, for each of the number of reference views of the respective coded view, an associated entry comprising
the relative camera parameter associated with the reference view of the respective coded view indexed by the index indexing the respective reference view,
wherein the relative camera parameter comprises a pair of scale and offset values, and the method comprises using the relative camera parameter to convert depth values of the associated reference view to disparity values between the coded view for which the relative camera parameter is present in the 3D video data stream and the reference view with which the relative camera parameter is associated.

5. A non-transitory digital storage medium having a computer program stored thereon to perform the method of claim 4,
when said computer program is run by a computer.

6. A method for encoding a 3D video data stream, the method comprising:
encoding into the 3D video data stream a set of coded views in temporal units;
encoding into the 3D video data stream a parameter set comprising a first table comprising an entry for each coded view, which comprises
a value indicating a count of a number of reference views,
for each coded view for which the count of the number of reference views exceeds zero,
a flag indicating whether, for each of the number of reference views of the respective coded view, a relative camera parameter associated with the respective reference view is present in the first table or within portions of the 3D video data stream not exceeding the scope of the temporal units,
for each of the number of reference views of the respective coded view
an index indexing the respective reference view, and
if the flag indicates that, for each of the number of reference views of the respective coded view, the relative camera parameter associated with the respective reference view is present in the first table, the relative camera parameter associated with the respective reference view of the respective coded view, wherein a scope of the parameter set is beyond the scope of the temporal units, encoding into the 3D video data stream, for each coded view for which the flag indicates that, for each of the number of reference views of the respective coded view, the relative camera parameter associated with the respective reference view is present within portions of the 3D video data stream not exceeding the scope of the temporal units, within each temporal unit encompassed by the scope of the parameter set a temporal unit scope parameter set for the respective coded view, the temporal unit scope parameter set comprising a second table comprising, for each of the number of reference views of the respective coded view, an associated entry comprising the relative camera parameter associated with the reference view of the respective coded view indexed by the index indexing the respective reference view, wherein the relative camera parameter comprises a pair of scale and offset values to convert depth values of the associated reference view to disparity values between the coded view for which the relative camera parameter is present in the 3D video data stream and the reference view with which the relative camera parameter is associated.

7. A non-transitory digital storage medium having a computer program stored thereon to perform the method of claim 6, when said computer program is run by a computer.

* * * * *